US009374221B1

(12) United States Patent
Juels et al.

(10) Patent No.: US 9,374,221 B1
(45) Date of Patent: Jun. 21, 2016

(54) DISTRIBUTED PROTECTION OF CREDENTIAL STORES UTILIZING MULTIPLE KEYS DERIVED FROM A MASTER KEY

(71) Applicant: EMC Corporation, Hopkinton, MA (US)

(72) Inventors: Ari Juels, Brookline, MA (US); Samuel J. Curry, North Andover, MA (US)

(73) Assignee: EMC Corporation, Hopkinton, MA (US)

( * ) Notice: Subject to any disclaimer, the term of this patent is extended or adjusted under 35 U.S.C. 154(b) by 175 days.

(21) Appl. No.: 14/136,423

(22) Filed: Dec. 20, 2013

(51) Int. Cl.
*H04L 29/06* (2006.01)
*H04L 9/32* (2006.01)

(52) U.S. Cl.
CPC .................................... *H04L 9/321* (2013.01)

(58) Field of Classification Search
CPC .............................. H04L 9/312; H04L 63/0823
USPC ......................................................... 713/155
See application file for complete search history.

(56) References Cited

U.S. PATENT DOCUMENTS

| 2008/0077982 | A1* | 3/2008 | Hayler ................. G06F 12/1466 726/12 |
| 2011/0213969 | A1* | 9/2011 | Nakhjiri et al. ................ 713/158 |
| 2013/0275776 | A1* | 10/2013 | Baptist ................ H04L 67/1097 713/193 |
| 2015/0172272 | A1* | 6/2015 | Levner .............................. 726/5 |

OTHER PUBLICATIONS

Guor-huar Lu; Vault: A Secure Binding Service; Year:2006; Citeseer; p. 1-16.*
J. Brainard et al., "A New Two-Server Approach for Authentication with Short Secrets," Proceedings of the 12th USENIX Security Symposium, Aug. 2003, pp. 201-214.
J. Camenisch et al., "Practical Yet Universally Composable Two-Server Password-Authenticated Secret Sharing,"Proceedings of the ACM Conference on Computer and Communications Security (CCS), Oct. 2012, pp. 525-536.
EMC Corporation, "RSA Distributed Credential Protection," http://www.emc.com/security/rsa-distributed-credential-protection.htm, 2013, 6 pages.
Taher Elgamal, "A Public Key Cryptosystem and a Signature Scheme Based on Discrete Logarithms," IEEE Transactions on Information Theory, Jul. 1985, vol. IT-31, No. 4.

(Continued)

*Primary Examiner* — Monjour Rahim
(74) *Attorney, Agent, or Firm* — Ryan, Mason & Lewis, LLP

(57) ABSTRACT

A user device is configured for communication with a distributed verification system over a network. The user device generates first and second keys from a master key for a password vault or other credential store, provides the first key to the distributed verification system, encrypts the credential store based at least in part on the second key, and provides the encrypted credential store to the distributed verification system. The credential store is encrypted utilizing the second key and information that is stored in a distributed manner over a plurality of servers of the distributed verification system. For example, encrypting the credential store illustratively comprises generating a ciphertext by encrypting the credential store utilizing the second key, obtaining a third key stored in the distributed manner over the servers, and encrypting the ciphertext utilizing the third key to generate the encrypted credential store that is provided to the distributed verification system.

19 Claims, 3 Drawing Sheets

(56) References Cited

OTHER PUBLICATIONS

David Pogue, "Remember All Those Passwords? No Need," The New York Times, Jun. 2013, 2 pages.

U.S. Appl. No. 14/041,150 filed in the name of A. Juels et al. on Sep. 30, 2013 and entitled "Message Encryption and Decryption Utilizing Low-Entropy Keys."

* cited by examiner

US 9,374,221 B1

DISTRIBUTED PROTECTION OF CREDENTIAL STORES UTILIZING MULTIPLE KEYS DERIVED FROM A MASTER KEY

FIELD

The field relates generally to verification systems, and more particularly to techniques for protecting password vaults and other types of credential stores.

BACKGROUND

In order to gain access to protected resources, users are often required to enter static passwords in order to prove their identity. Different applications, accounts or other types of protected resources associated with a given user may each require entry of a distinct alphanumeric password, thereby necessitating that the user remember multiple such passwords in order to access the corresponding resources. This is not only unduly burdensome for the user, but can also undermine security in that the user will often write down the passwords or otherwise make them vulnerable to inadvertent disclosure.

Various techniques have been developed in an attempt to alleviate this situation. For example, it is possible for a user to store multiple passwords in encrypted form in a so-called password "vault" that is protected by a master password. Password vaults are an increasingly popular tool for users to manage and protect their many passwords. Nonetheless, such arrangements can remain susceptible to attack. In the case of a password vault, compromise of the master password gives the attacker immediate access to multiple valid passwords stored in the vault. This is a real risk, as users often pick weak passwords, particularly ones, like master passwords, that they use often.

Moreover, a service provider that stores password vaults for a population of users risks en bloc compromise and cracking of these vaults, and a cascade of compromises of applications, accounts or other protected resources associated with the passwords contained in these vaults. Similar issues arise in hashed password files and other arrangements involving storage of multiple valid passwords or other types of credentials.

Conventional techniques have been unable to provide adequate protection of password vaults and other types of credential stores, particularly when the stores are held by a service provider or other similar entity on behalf of a user.

Accordingly, a need exists for techniques that can provide improved security for password vaults and other credential stores.

SUMMARY

Illustrative embodiments of the present invention provide distributed protection of a password vault or other credential store utilizing multiple keys derived from a master key of the credential store.

In one embodiment, a user device is configured for communication with a distributed verification system over a network. The user device generates first and second keys from a master key for a password vault or other credential store, provides the first key to the distributed verification system, encrypts the credential store based at least in part on the second key, and provides the encrypted credential store to the distributed verification system. The credential store is encrypted utilizing the second key and information that is stored in a distributed manner over a plurality of servers of the distributed verification system.

By way of example only, encrypting the credential store based at least in part on the second key illustratively comprises generating a ciphertext by encrypting the credential store utilizing the second key, obtaining a third key stored in the distributed manner over the plurality of servers, and encrypting the ciphertext utilizing the third key to generate the encrypted credential store that is provided to the distributed verification system.

As another example, encrypting the credential store based at least in part on the second key illustratively comprises encrypting the credential store utilizing a combination of the second key and a third key that is stored in a distributed manner over the plurality of servers of the distributed verification system.

The third key in the foregoing examples may be generated by the user device and provided to the distributed verification system for distributed storage over the plurality of servers. Alternatively, the third key may be generated by the distributed verification system, stored by the distributed verification system over the plurality of servers, and provided by the distributed verification system to the user device, possibly as shares from respective ones of the servers of the distributed verification system.

In another embodiment, a distributed verification system is configured for communication with a user device over a network. The distributed verification system is further configured to receive from the user device a first key generated from a master key for a credential store, and to receive from the user device an encrypted version of the credential store, the encrypted credential store being encrypted by the user device based at least in part on a second key generated from the master key and information that is stored in a distributed manner over a plurality of servers of the distributed verification system. The distributed verification system utilizes the first key to control access to the encrypted credential store.

For example, the distributed verification system utilizes the first key to authenticate a user associated with a user device, and responsive to successful authentication of the user provides the encrypted credential store to the user device, with the user device decrypting the encrypted credential store based at least in part on the second key to recover the credential store.

Other embodiments include without limitation methods, apparatus, systems, and articles of manufacture comprising processor-readable storage media.

DETAILED DESCRIPTION

Illustrative embodiments of the present invention will be described herein with reference to exemplary communication systems, distributed verification systems and associated processing devices. It is to be appreciated, however, that the invention is not restricted to use with the particular illustrative system and device configurations shown. Accordingly, the term "distributed verification system" as used herein is intended to be broadly construed, so as to encompass, for example, systems comprising only a single processing device, systems in which multiple processing devices communicate with one another over a network or other connection, and numerous other system types and configurations. Similarly, the term "user device" as used herein is intended to be broadly construed so as to encompass, for example, a computer, a mobile telephone or other arrangement of one or more processing devices.

Figure 1:
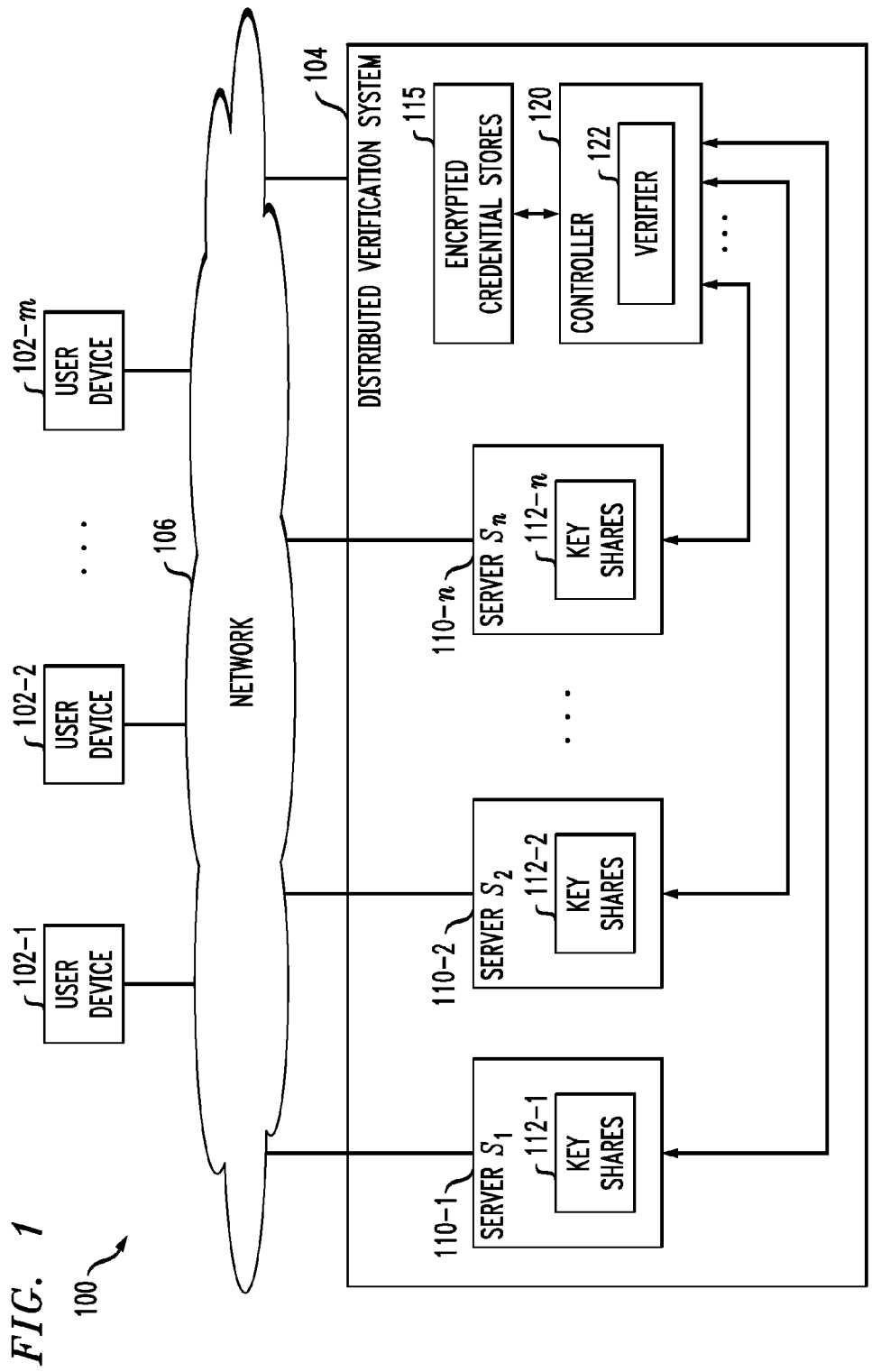
FIG. 1 is a block diagram of a communication system that implements functionality for distributed protection of credential stores in an illustrative embodiment of the invention.

FIG. 1 shows a communication system 100 in an illustrative embodiment of the present invention. The system 100 comprises a plurality of user devices 102-1, 102-2, . . . 102-m that are configured to communicate with a distributed verification system 104 over a network 106 in order to gain access to protected resources that are not explicitly shown in figure. The protected resources may reside on the user devices 102, within the distributed verification system 104, or on other devices elsewhere in the system 100, and may comprise, for example, applications, web sites, multi-user computer systems, etc. Although this communication system embodiment contemplates an arbitrary plural number m of user devices 102, other embodiments may include only a single user device.

The distributed verification system 104 comprises a plurality of servers 110-1, 110-2, . . . 110-n, also denoted as servers $S_1, S_2, \ldots S_n$, respectively, where n is greater than or equal to two. It should be understood that the particular configuration of servers shown in this embodiment is exemplary only. Accordingly, other embodiments may utilize a wide variety of different numbers, types and arrangements of two or more servers in implementing the distributed verification system 104.

It is assumed in the present embodiment that each of the user devices 102 is able to communicate over the network 106 with each of the servers 110, although other arrangements can be used in other embodiments. For example, in some embodiments, at least some communications between the user devices 102 and one or more of the servers 110 may alternatively flow through one or more protected resources that are not explicitly shown. In such an arrangement, at least portions of the protected resources may be coupled to the network 106 and at least portions of the distributed verification system 104 may be decoupled from the network 106.

The user devices 102 may comprise, for example, mobile telephones, laptop or tablet computers, desktop computers, gaming consoles or other user devices in any combination. Each such device may be associated with a corresponding user to be subject to verification in the system 100, where "user" as the term is applied herein should be generally construed so as to encompass, for example, a human user or an associated hardware or software entity. Numerous alternative arrangements are possible.

A given user device may incorporate or otherwise have associated therewith a hardware or software authentication token, although such tokens are not required in embodiments of the invention. One example of an authentication token that may be used in conjunction with user verification in some embodiments is a time-synchronous authentication token such as an RSA SecurID® user authentication token, commercially available from RSA, The Security Division of EMC Corporation, of Bedford, Mass., U.S.A. For example, personal identification numbers (PINs) or other personal identifiers typically used in conjunction with authentication tokens to implement two-factor authentication processes may be viewed as respective passwords as that term is broadly used herein. Accordingly, the term "password" as used herein should be understood to encompass any arrangement of words, phrases, numbers or other combination of characters suitable for user verification.

The network 106 may comprise, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of networks.

The servers 110-1, 110-2, . . . 110-n in the FIG. 1 embodiment store respective key shares 112-1, 112-2 . . . 112-n as shown. The key shares 112 are assumed to be stored in respective memories of the servers 110. Such storage may include only partial or temporary storage of the key shares 112.

The servers 110 may be implemented, for example, as respective physically separated processing devices, possibly located in different computing systems or organizations. Alternatively, such servers may represent distinct virtual servers that may reside on the same physical infrastructure. Other types of multiple server arrangements may be used in implementing the distributed verification system 104. Accordingly, the term "server" as used herein is intended to be broadly construed.

The distributed verification system 104 further comprises encrypted credential stores 115 and a controller 120 that is coupled to the servers 110 and to the encrypted credential stores 115. The controller 120 includes a verifier 122. The controller 120 directs the functionality of the distributed verification system 104 in a manner to be described in more detail below. Although this embodiment is illustratively shown as comprising a centralized implementation of controller 120, in other embodiments a distributed implementation of controller 120 may be used, possibly with different portions of the controller 120 being implemented in respective ones of at least a subset of the servers 110.

The distributed verification system 104 in some embodiments is implemented by or otherwise associated with a service provider that maintains the encrypted credential stores 115 for respective users corresponding to respective ones of the user devices 102. The credential stores may comprise, for example, respective password vaults, password files or other arrangements of one or more passwords.

Also, although shown as comprising a separate component of the distributed verification system 104, the encrypted credential stores 115 may alternatively be stored in a distributed manner across the servers 110.

In order to configure a credential store for encrypted storage in the distributed verification system 104, a given one of the user devices 102, illustratively the user device 102-1, generates first and second keys from a master key for the credential store, provides the first key to the distributed verification system 104, encrypts the credential store based at least in part on the second key, and provides the encrypted credential store to the distributed verification system 104 for storage as one of the encrypted credential stores 115.

The credential store in the present embodiment is more particularly encrypted utilizing the second key and information that is stored in a distributed manner over the servers 110 of the distributed verification system 104.

For example, encrypting the credential store in the given user device 102-1 based at least in part on the second key illustratively comprises generating a ciphertext by encrypting the credential store utilizing the second key, obtaining a third key stored in the distributed manner over the servers 110 as at least portions of respective key shares 112, and encrypting the ciphertext utilizing the third key to generate the encrypted credential store that is provided to the distributed verification system 104 for storage as one of the encrypted credential stores 115.

As another example, encrypting the credential store in the given user device 102-1 based at least in part on the second key illustratively comprises encrypting the credential store utilizing a combination of the second key and a third key that is stored in a distributed manner over the servers 110 as at least portions of respective key shares 112.

The third key in the foregoing examples may be generated by the given user device 102-1 and provided to the distributed verification system 104 for distributed storage over the plurality of servers 110 as at least portions of respective key shares 112. Alternatively, the third key may be generated by the distributed verification system 104, stored by the distributed verification system over the servers 110 as at least portions of respective key shares 112. The third key in the latter arrangement is provided by the distributed verification system 104 to the user device 102-1, possibly as at least portions of key shares 112 provided directly from respective ones of the servers 110 to the user device 102-1 over the network 106.

The above-described operations associated with configuration of a credential store for encrypted storage in the distributed verification system 104 are part of what is also referred to herein as a setup process of the system 100.

After a credential store has been stored as one of the encrypted credential stores 115 in the distributed verification system 104, it can be retrieved via one of the user devices 102, subject to appropriate authentication of a corresponding user. As indicated above, the distributed verification system 104 in the present embodiment receives the first key from the user device 102-1 in conjunction with configuring of the credential store for encrypted storage. The distributed verification system 104 utilizes the first key to control access to the encrypted credential store from a given user device 102-1.

For example, the distributed verification system 104 utilizes the first key to authenticate a user attempting to access the encrypted credential store from the given user device 102-1, and responsive to successful authentication of the corresponding user provides the encrypted credential store to the given user device, with the user device decrypting the encrypted credential store based at least in part on the second key to recover the credential store.

The above-described operations associated with retrieval of an encrypted credential store from the distributed verification system 104 are part of what is also referred to herein as a retrieval process of the system 100.

At least a portion of the operations that are performed within the distributed verification system 104 occur at least in part under the direction of controller 120, which utilizes verifier 122 to authenticate a user attempting to access one of the encrypted credential stores 115 from one of the user devices 102. For example, the controller 120 can be configured to direct each of the servers 110 to send its share of the above-noted third key to a requesting user device responsive to successful authentication of the corresponding user by the verifier 122.

The user devices 102 and distributed verification system 104 may each be implemented using one or more processing devices. A given such processing device may comprise, for example, a computer or other type of processing device configured to communicate with other such devices over the network 106. Each such processing device generally comprises at least one processor and an associated memory, and implements one or more functional modules for controlling certain features of the communication system 100.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. Such a memory and other memories disclosed herein may be viewed as examples of what are more generally referred to as "processor-readable storage media" storing executable computer program code.

Articles of manufacture comprising such processor-readable storage media are considered embodiments of the present invention. A given such article of manufacture may comprise, for example, a storage device such as a storage disk, a storage array or an integrated circuit containing memory. The term "article of manufacture" as used herein should be understood to exclude transitory, propagating signals.

Various elements of the communication system 100, such as the servers 110 and controller 120 of the distributed verification system 104, may be implemented at least in part in the form of software that is stored in a memory of a processing device and executed by a processor of that processing device.

The communication system 100 in the present embodiment implements processes for distributed protection of credential stores. Examples of respective setup and retrieval processes for distributed protection of a credential store will be described below in conjunction with FIGS. 2A and 2B, but it should be understood that numerous other types of processes may be used in other embodiments.

It is to be appreciated that the particular set of elements shown in FIG. 1 for providing distributed protection of credential stores is presented by way of example, and in other embodiments additional or alternative elements may be used. Thus, another embodiment may include additional networks and additional user devices, servers, systems or associated protected resources.

Communications among user devices, servers, protected resources and other system elements in embodiments of the invention may utilize authenticated, confidential and integrity-protected channels or other types of secure channels. For example, secure channels in some embodiments may be established using techniques such as secure sockets layer (SSL) or transport layer security (TLS). Such techniques are well known in the art and therefore not described in detail herein.

As mentioned previously, various elements of system 100 such as the servers 110 or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, storage devices or other types of processing devices. Examples of such processing platforms that may form at least a portion of the system 100 will be described below in conjunction with FIGS. 3 and 4.

The operation of the system 100 will now be further described with reference to the flow diagrams of FIGS. 2A and 2B, which illustrate sets of operations for respective setup and retrieval of a distributed credential store. As mentioned previously, such sets of operations are also referred to herein as respective setup and retrieval processes. It should again be noted in conjunction with these processes that the term "user" in this context and elsewhere herein should not be construed as limited to a human user, but may additionally or alternatively refer, for example, to a particular hardware or software entity.

Figure 2A:
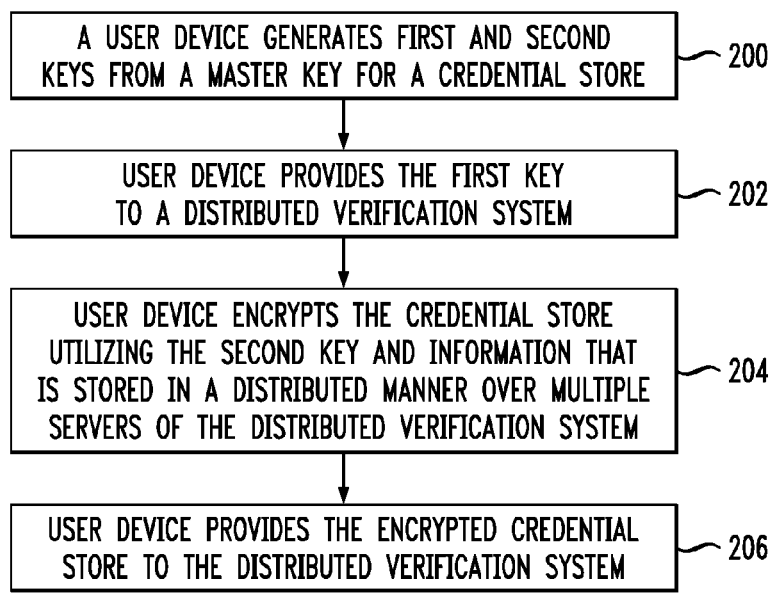
FIGS. 2A and 2B are flow diagrams of respective setup and retrieval processes associated with distributed protection of a credential store in the communication system of FIG. 1.

Referring initially to FIG. 2A, an exemplary setup process as shown includes steps 200 through 206, all of which are assumed to be performed primarily by a given one of the user devices 102, again illustratively the user device 102-1, in order to establish distributed protection of a credential store within the distributed verification system 104 for a corresponding user. It is to be appreciated that in other embodiments one or more such steps may be implemented at least in part by other system elements.

In step 200, the given user device 102-1 generates first and second keys from a master key for a credential store of a corresponding user. The master key may comprise, for example, a master password for a password vault, although other types of credential stores and associated master keys could be used.

The first and second keys are illustratively generated by applying respective keyed hash functions to the master key. For example, assuming that the master key comprises a master password MP, the first and second keys may be generated as respective keys $MK_0 = h_{\kappa_0}[MP]$ and $MK_1 = h_{\kappa_1}[MP]$, where $h_{\kappa(P)} \to \{0,1\}^l$ denotes a keyed hash function with key $\kappa$, $l$ is a security parameter, and $\{\kappa_0, \kappa_1\}$ are independent, randomly generated keys.

In step 202, the user device 102-1 provides the first key to the distributed verification system 104, illustratively over the network 106. For example, with reference to the foregoing example, providing the first key to the distributed verification system 104 may comprise registering $MK_0$ as a hashed password with the distributed verification system for controlling access to the encrypted credential store.

In step 204, the user device 102-1 encrypts the credential store based at least in part on the second key and information that is stored in a distributed manner over the servers 110 of the distributed verification system 104. As noted above, the information that is stored in a distributed manner over the servers 110 illustratively comprises a third key. In such arrangements, encrypting the credential store based at least in part on the second key may comprise, for example, generating a ciphertext by encrypting the credential store utilizing the second key, obtaining the third key, and encrypting the ciphertext utilizing the third key to generate the encrypted credential store that is provided to the distributed verification system 104. As another example, encrypting the credential store based at least in part on the second key may comprise encrypting the credential store utilizing a combination of the second key and the third key. Other types of encryption using the second and third keys, or more generally using the second key and information stored in a distributed manner over the servers 110, may be used.

The third key may be generated, for example, by random selection from a designated key space. For at least some of those embodiments that utilize a third key as described above, the third key may be generated by the user device 102-1 and provided in its entirety to the distributed verification system 104 for distributed storage over the servers 110 or provided directly by the user device as portions of key shares 112 to respective ones of the servers 110. In other embodiments, the third key may be generated in the distributed verification system 104 and stored in a distributed manner over the servers 110 as portions of key shares 112. The key shares 112 illustratively store multiple third keys in a distributed manner, with one such third key for each of the encrypted credential stores 115. The user device 102-1 can obtain the third key for one of the encrypted credential stores by receiving shares of the third key from respective ones of the servers 110 of the distributed verification system 104.

In step 206, the user device 102-1 provides the encrypted credential store to the distributed verification system 104 for storage as one of the encrypted credential stores 115. This completes the setup process for that particular encrypted credential store.

Figure 2B:
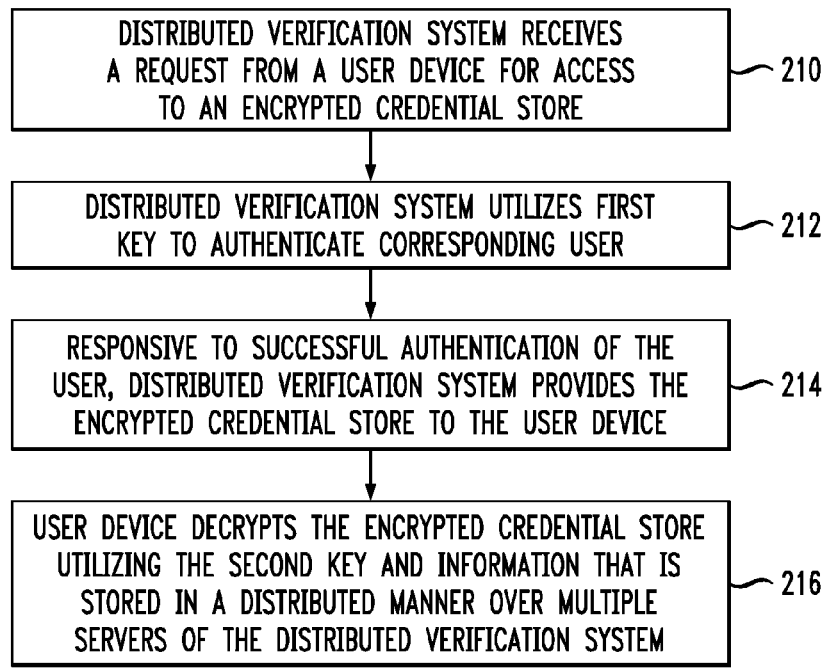

FIG. 2B shows an exemplary retrieval process that is applied after completion of the setup process of FIG. 2A. The retrieval process as shown includes steps 210 through 216, with steps 210, 212 and 214 being performed primarily by the distributed verification system 104 and step 216 being performed primarily by the given user device 102-1. Again, it is to be appreciated that in other embodiments one or more such steps may be implemented at least in part by other system elements.

In step 210, the distributed verification system 104 receives a request from the user device 102-1 for access to one of the encrypted credential stores 115.

In step 212, the distributed verification system 104 utilizes the first key provided to it in step 202 of FIG. 2A to authenticate a corresponding user. As indicated previously, the first key is generated from the master key for the credential store and provided to the distributed verification system 104 by the user device 102-1.

In step 214, responsive to successful authentication of the user, the distributed verification system 104 provides the encrypted credential store to the user device 102-1.

In step 216, the user device 102-1 decrypts the encrypted credential store utilizing the second key and information that is stored in a distributed manner over the servers 110 in order to recover the original credential store. The information that is stored in a distributed manner over the servers 110 illustratively comprises the above-described third key. For example, decrypting the encrypted credential store in the user device 102-1 based at least in part on the second and third keys may comprise obtaining the third key, possibly as key shares received directly from respective ones of the servers 110, decrypting the received encrypted credential store utilizing the third key to obtain a ciphertext, and decrypting the ciphertext utilizing the second key to recover the credential store. As another example, decrypting the encrypted credential store based at least in part on the second and third keys comprises combining the second key and the third key to generate a combined key, and decrypting the encrypted credential store utilizing the combined key to recover the credential store.

After the credential store is retrieved from the distributed verification system 104 in the manner described above, the passwords or other credentials contained therein may be utilized by the user at the user device 102-1 to obtain access to protected resources. More particularly, access to a given one of the protected resources is granted or denied based on the evaluation of a submitted password or other credential from the recovered credential store.

A number of examples of possible implementations of the setup and retrieval processes of FIGS. 2A and 2B will now be described in more detail.

It is assumed for these examples that the credential store comprises a password vault V that is encrypted under a master password MP. The distributed verification system 104 is more particularly referred to in the context of these examples as a distributed password verification system or DPVS.

It is further assumed that the DPVS is configured such that the distributed storage over servers 110 utilizes a (k, n)-thresholding arrangement in which k of the n servers 110 must function correctly in order to achieve security and availability objectives. In other embodiments, such thresholding is not required.

As will be described, the DPVS is configured such that the password vault V is accessible by a user with knowledge of MP alone, but such that even full system compromise does not directly reveal the password vault V. This is achieved in the present examples and other embodiments herein by decoupling verification of the master password MP from decryption of the password vault V, such that each process employs a distinct key derived from the master password MP.

For purposes of the present examples, let $h_\kappa(P) \rightarrow \{0,1\}^l$ denote a one-way function, and more particularly a keyed hash function with key $\kappa$, where l is a security parameter. Let $\{K_0, K_1\}$ be independent, randomly generated keys. Let (enc, dec) denote symmetric-key encryption and decryption functions.

An exemplary setup process in this context is as follows:
Setup (V, MP)
1. Derive keys $MK_0 = h_{K_0}[MP]$ and $MK_1 = h_{K_1}[MP]$ and select random key $\lambda \leftarrow \{0,1\}_l$.
2. Compute the MP-encrypted vault as a first ciphertext $c = enc_{MK_1}[V]$.
3. Compute a second ciphertext $C = enc_\lambda[c]$ as an encryption of the first ciphertext.
4. Register $MK_0$ as a hashed password with the DPVS for protection of V.
5. Distribute $\lambda$ across the servers 110 within the DPVS.
6. Store C using one or more servers or other components of the DPVS.

In the above setup process, Steps 1-4 are assumed to performed primarily by a particular one of the user devices 102, and Steps 5 and 6 are assumed to be performed primarily by the DPVS. The derived keys $MK_0$ and $MK_1$ are considered examples of what are more generally referred to herein as respective "first and second keys" generated from a master key, and the key $\lambda$ is an example of what is more generally referred to herein as a "third key." In other embodiments, the third key $\lambda$ may be generated in a distributed manner by the DPVS, with shares being sent by the DPVS or respective servers 110 to the user device. The second ciphertext C may be viewed as an example of one of the encrypted credential stores 115.

An exemplary retrieval process in this context is as follows:
Retrieve (MP)
1. Derive keys $MK_0 = h_{K_0}[MP]$ and $MK_1 = h_{K_0}[MP]$.
2. Authenticate to the DPVS using hashed password $MX_0$.
3. Recover $\lambda$ from the DPVS by retrieving shares from respective servers 110.
4. Download C from the DPVS.
5. Compute $V = dec_{MK_1}[c = dec_\lambda[C]]$.

In the above retrieval process, Steps 1-5 are assumed to performed primarily by a particular one of the user devices 102, with some involvement in Steps 2, 3 and 4 by the DPVS.

These exemplary setup and retrieval processes are configured such that an adversary that compromises fewer than k of the n servers 110 can feasibly obtain no information about the password vault V. Collectively, the servers and possibly other components of the DPVS store only the triple (C, $MK_0$, $\lambda$). Thus, only these three values are obtainable by an adversary that compromises k or more of the n servers in a given epoch. Deriving the password vault V from the triple (C, $MK_0$, $\lambda$) is effectively as hard as cracking the encrypted password vault V. More particularly, the adversary can compute $c = dec_\lambda[C]$, but in order to obtain the password vault V must either derive MP from $MK_0$, i.e., crack the hash $h_{K_0}$, or crack c directly, similarly by guessing MP.

In some embodiments, standard techniques are applied in order to ensure vault integrity or freshness, although such issues are not explicitly addressed in the descriptions of the exemplary setup and retrieval processes above.

In one possible variant of the above-described exemplary setup and retrieval processes, a single layer of encryption is used instead of multiple layers of encryption. For example, rather than applying keys $MK_1$ and $\lambda$ in separate encryption layers, it is possible to encrypt V using a single encryption layer under a combined key generated by combining $MK_1$ and $\lambda$ under a designated key-combining function. The key-combining function may be an exclusive-or (XOR) function or other type of logic function.

It should be noted that alternative embodiments can combine distributed protection of the password vault V or other credential stores with honey encryption techniques as described in U.S. patent application Ser. No. 14/041,150, filed Sep. 30, 2013 and entitled "Message Encryption and Decryption Utilizing Low-Entropy Keys," which is commonly assigned herewith and incorporated by reference herein. In such an arrangement, the master password MP or other master key is replaced with its corresponding equivalence class, and even upon complete system compromise, an adversary that obtains the triple (C, $MK_0$, $\lambda$) is information-theoretically unable to determine MP or V.

It is also possible for the servers 110 in the DPVS to insert into a ciphertext for V passwords that the servers jointly generate or have previously stored in distributed form. Such insertion may be accomplished using a symmetric-key approach or a public-key approach, examples of which are described below.

In an exemplary symmetric-key approach, the servers 110 can be configured to transmit respective shares to a given one of the user devices for local reconstruction and insertion into the password vault V in plaintext form.

In an exemplary public-key approach, both the user device and the servers can be configured to perform public-key encryption instead of symmetric-key encryption in order to support the ability to add passwords to the password vault V without decrypting it. In such an arrangement, distinct layers of encryption applied by the user device and the servers may be combined homomorphically such that password addition of this type is possible even to the ciphertext c.

As a more particular example, let x be a private key for El Gamal encryption in a group G derived from the master password MP, with corresponding public key y. Let x' be a private key distributed within the DPVS, with corresponding public key y'. Then a user device may encrypt a credential in the form of a message m∈G in its vault as (my$^r$, g$^r$). This ciphertext may be re-encrypted under the DPVS-generated public key y', by adding an extra ciphertext component, given by (my$^r$, y'$^{r'}$, g$^{r'}$). In such an arrangement, it is possible to encrypt a message m directly under the pair of public keys (y, y').

Alternatively, public-key encryption by the user device alone may be used to permit insertion of credentials into an encrypted vault.

The particular processing operations and other system functionality described in conjunction with the flow diagrams of FIGS. 2A and 2B are presented by way of illustrative example only, and should not be construed as limiting the scope of the invention in any way. Alternative embodiments can use other types of processing operations for distributed protection of credential stores in a distributed verification system. For example, the ordering of the process steps may be varied in other embodiments, or certain steps may be performed concurrently with one another rather than serially.

Multiple instances of the process can be performed for setup and retrieval of respective different ones of the encrypted credential stores 115 for different users or different ones of the user devices 102.

Also, other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be further described herein, although embodiments of the present invention may incorporate aspects of such processes.

Embodiments of the invention can be implemented using a wide variety of different types of credential stores. For example, a credential store as that term is used herein is intended to encompass not only password vaults but also other arrangements of multiple stored passwords or other credentials, such as hashed password files. As a more particular example, a password file F may utilize a cryptographic hash function H to store hashes of passwords rather than raw passwords, with the file F containing username and password-hash pairs. The computation of the hash function H may involve the use of system-specific or user-specific parameters (e.g., per-system or per-user "salts"). The file F may be viewed as an example of what is also referred to herein as a "hashed password file."

Some embodiments are illustratively configured to incorporate proactivation functionality of various types. For example, proactive updating of the credential stores may be performed in each of a plurality of "epochs." Such epochs as the term is broadly used herein should be understood to encompass respective periods of time during which proactivation is performed. Epochs need not be of uniform length, and accordingly may vary in length over time and may also vary from user to user.

In addition, some embodiments are configured to incorporate multiple copies of information items that are stored in a distributed manner in the system 100, using respective multiple sets of the servers 110.

These and other embodiments may be configured to utilize multiple distinct pools of storage repositories, such as a "red" pool and a "blue" pool, for storing respective distinct portions of a given information item. Such storage repositories may comprise any type of networked processing devices, including consumer devices such as mobile telephones, tablet or laptop computers, wearable computers, smart watches, smart glasses and other objects that may be characterized as part of an Internet of Things (IoT).

The foregoing embodiments should be considered as illustrative only, and numerous other embodiments can be configured using the techniques disclosed herein, in a wide variety of different authentication applications.

It should also be understood that functionality for distributed protection of credential stores as described in conjunction with FIGS. 1, 2A and 2B can be implemented at least in part in the form of one or more software programs stored in memory and executed by a processor of a processing device such as a computer. As mentioned previously, a memory or other storage device having such program code embodied therein is an example of what is more generally referred to herein as a "processor-readable storage medium."

The embodiments described in conjunction with FIGS. 1, 2A and 2B can provide a number of significant advantages relative to conventional practice. For example, these embodiments exhibit significantly enhanced security relative to conventional arrangements in which multiple valid passwords are stored together in a single location, such as in a password vault or a hashed password file, Embodiments of the present invention can be used in the password vault or hashed password file contexts as well as other credential store contexts. The term "password" as used herein is intended to be broadly construed, so as to encompass a concatenation or other combination of multiple sub-passwords, each of which may be used to allow a given user to access a different protected resource.

As indicated previously, the communication system 100 may be implemented using one or more processing platforms. One or more of the processing modules or other components of system 100 may therefore each run on a computer, storage device or other processing platform element. A given such element may be viewed as an example of what is more generally referred to herein as a "processing device."

Figure 3:
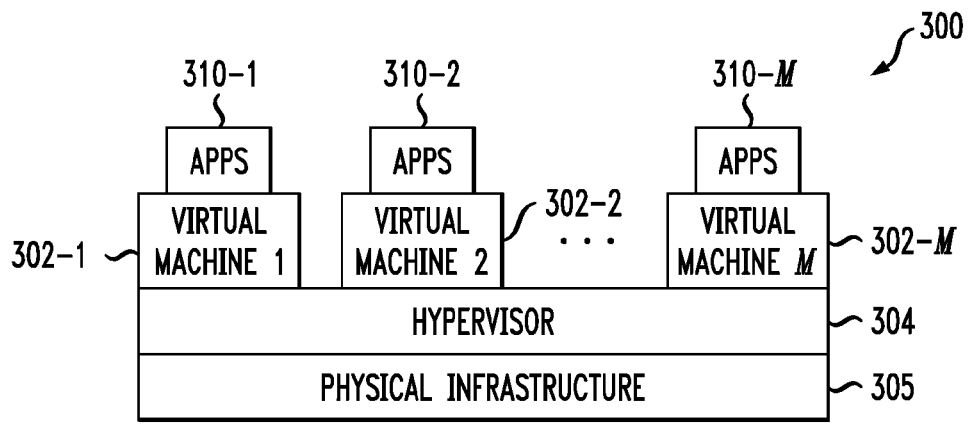
FIGS. 3 and 4 show examples of processing platforms that may be utilized to implement at least a portion of the communication system of FIG. 1.

Referring now to FIG. 3, one possible processing platform that may be used to implement at least a portion of one or more embodiments of the invention comprises cloud infrastructure 300. The cloud infrastructure 300 in this exemplary processing platform comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304.

The cloud infrastructure 300 may encompass the entire system 100 or only portions of that system, such as one or more of the user devices, servers, controllers or protected resources in the system 100.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of system 100 in one or more embodiments of the invention is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products and other processing platform components may be utilized to implement at least a portion of the system 100.

Figure 4:
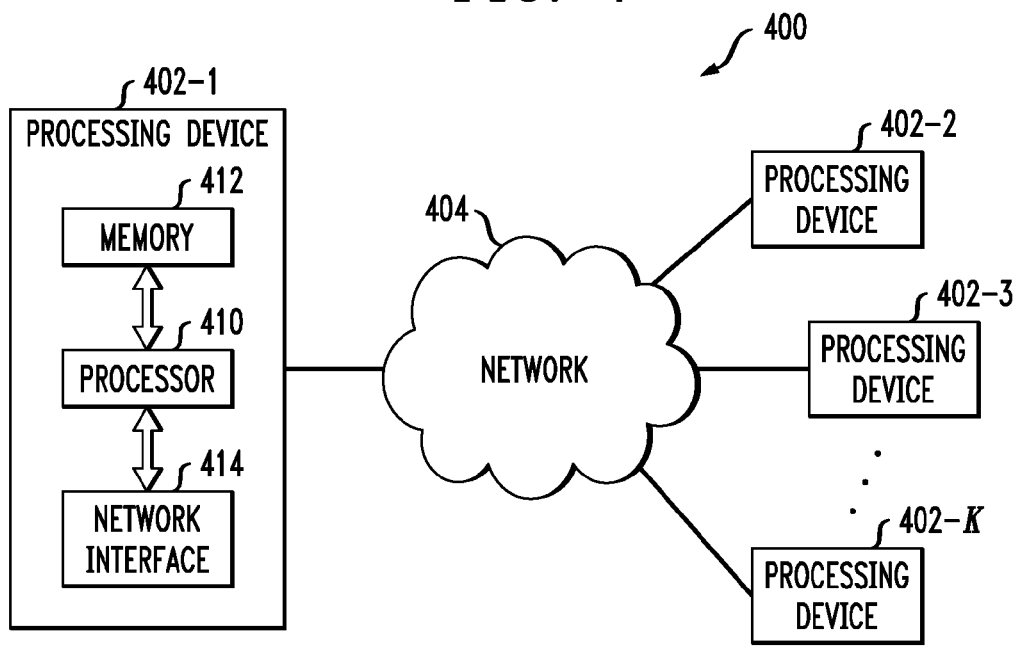

Another example of a processing platform is processing platform 400 shown in FIG. 4. The processing platform 400 in this embodiment comprises at least a portion of the system 100 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, a cellular network, a wireless network such as a WiFi or WiMAX network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "processor-readable storage medium" having executable computer program code or other software programs embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, storage devices or other processing devices.

Multiple elements of system 100 may be collectively implemented on a common processing platform of the type shown in FIG. 3 or 4, or each such element may be implemented on a separate processing platform.

As indicated previously, components of a communication system as disclosed herein can be implemented at least in part in the form of one or more software programs stored in memory and executed by a processor of a processing device such as one of the processing devices 402. As noted above, a memory or other storage device having such program code embodied therein is an example of what is more generally referred to herein as a processor-readable storage medium. As noted above, articles of manufacture comprising such processor-readable storage media are considered embodiments of the present invention.

It should again be emphasized that the above-described embodiments of the invention are presented for purposes of illustration only. Many variations and other alternative embodiments may be used. For example, the techniques are applicable to a wide variety of other types of devices and systems that can benefit from improved credential store security as disclosed herein. Also, the particular configuration of communication system and processing device elements shown in FIGS. 1-4, and the associated distributed protection techniques, can be varied in other embodiments. Moreover, the various simplifying assumptions made above in the course of describing the illustrative embodiments should also be viewed as exemplary rather than as requirements or limitations of the invention, and need not apply in other embodiments. Numerous other alternative embodiments within the scope of the appended claims will be readily apparent to those skilled in the art.

What is claimed is:

1. A method comprising:
generating, at a user device configured for communication with a distributed verification system over a network, first and second keys from a master key for a credential store;
providing the first key to the distributed verification system;
encrypting the credential store based at least in part on the second key; and
providing the encrypted credential store to the distributed verification system, the distributed verification system comprising a controller configured to authenticate a user attempting to access the credential store;
wherein encrypting the credential store based at least in part on the second key comprises encrypting the credential store utilizing the second key and information that is stored in a distributed manner over a plurality of servers of the distributed verification system;
wherein said generating, providing the first key, encrypting, and providing the encrypted credential store are performed by at least one processing device comprising a hardware processor coupled to a memory; and
wherein encrypting the credential store based at least in part on the second key comprises:
generating a ciphertext by encrypting the credential store utilizing the second key;
obtaining a third key; and
encrypting the ciphertext utilizing the third key to generate the encrypted credential store that is provided to the distributed verification system;
wherein the information that is stored in a distributed manner over the plurality of servers of the distributed verification system comprises the third key.

2. The method of claim 1 wherein obtaining the third key comprises generating the third key in the processing device.

3. The method of claim 2 further comprising providing the third key to the distributed verification system for distributed storage over the plurality of servers.

4. The method of claim 1 wherein obtaining the third key comprises receiving shares of the third key in the processing device from respective ones of the servers of the distributed verification system.

5. The method of claim 1 wherein the third key is generated by random selection from a designated key space.

6. The method of claim 1 wherein the first and second keys are generated by applying respective keyed hash functions to the master key.

7. The method of claim 6 wherein the master key comprises a master password MP and the first and second keys are given by $MK_0 = h_{\kappa_0}[MP]$ and $MK_1 = h_{\kappa_1}[MP]$, where $h_\kappa(P) \to \{0,1\}^l$ denotes a keyed hash function with key $\kappa$, $l$ is a security parameter, and $\{\kappa_0, \kappa_1\}$ are independent, randomly generated keys.

8. The method of claim 7 wherein providing the first key to the distributed verification system comprises registering $MK_0$ as a hashed password with the distributed verification system for controlling access to the encrypted credential store.

9. A method comprising:
generating, at a user device configured for communication with a distributed verification system over a network, first and second keys from a master key for a credential store;
providing the first key to the distributed verification system;
encrypting the credential store based at least in part on the second key; and
providing the encrypted credential store to the distributed verification system, the distributed verification system comprising a controller configured to authenticate a user attempting to access the credential store;
wherein encrypting the credential store based at least in part on the second key comprises encrypting the credential store utilizing the second key and information that is stored in a distributed manner over a plurality of servers of the distributed verification system;
wherein said generating, providing the first key, encrypting, and providing the encrypted credential store are performed by at least one processing device comprising a hardware processor coupled to a memory; and
wherein encrypting the credential store based at least in part on the second key comprises encrypting the credential store utilizing a combination of the second key and a third key that is stored in a distributed manner over the plurality of servers of the distributed verification system.

10. The method of claim 1 further comprising:
authenticating to the distributed verification system utilizing the first key;
responsive to successful authentication, receiving the encrypted credential store from the distributed verification system; and
decrypting the encrypted credential store based at least in part on the second key to recover the credential store.

11. The method of claim 10 wherein decrypting the encrypted credential store based at least in part on the second key comprises:
obtaining the third key;
decrypting the received encrypted credential store utilizing the third key to obtain a ciphertext; and
decrypting the ciphertext utilizing the second key to recover the credential store.

12. The method of claim 9 wherein decrypting the encrypted credential store based at least in part on the second key comprises:
obtaining the third key;
combining the second key and the third key to generate a combined key; and
decrypting the encrypted credential store utilizing the combined key.

13. An article of manufacture comprising a non-transitory processor-readable storage medium having embodied therein one or more software programs, wherein the one or more software programs when executed by said at least one processing device cause the method of claim 1 to be performed.

14. An apparatus comprising:
a user device configured for communication with a distributed verification system over a network;
the user device comprising a hardware processor coupled to a memory;
wherein said user device is further configured:
to generate first and second keys from a master key for a credential store;
to provide the first key to the distributed verification system;
to encrypt the credential store based at least in part on the second key; and
to provide the encrypted credential store to the distributed verification system, the distributed verification system comprising a controller configured to authenticate a user attempting to access the credential store;
wherein the credential store is encrypted utilizing the second key and information that is stored in a distributed manner over a plurality of servers of the distributed verification system;
wherein encryption of the credential store comprises generating a ciphertext by encrypting the credential store utilizing the second key, obtaining a third key, and encrypting the ciphertext utilizing the third key to generate the encrypted credential store that is provided to the distributed verification system; and
wherein the information that is stored in a distributed manner over the plurality of servers of the distributed verification system comprises the third key.

15. The apparatus of claim 14 wherein said user device comprises one of a computer and a mobile telephone.

16. A method comprising:
receiving, from a user device, a first key in a distributed verification system, the distributed verification system being configured to communicate with the user device over a network, the first key being generated from a master key for a credential store;
receiving an encrypted version of the credential store, the encrypted credential store being encrypted based at least in part on a second key generated from the master key and information that is stored in a distributed manner over a plurality of servers of the distributed verification system, the distributed verification system comprising a controller configured to authenticate a user attempting to access the credential store; and
utilizing the first key to control access to the encrypted credential store;
wherein said receiving a first key, receiving an encrypted version of the credential store, and utilizing the first key to control access are performed by at least one processing device comprising a hardware processor coupled to a memory;
wherein encryption of the credential store comprises generating a ciphertext by encrypting the credential store utilizing the second key, obtaining a third key, and encrypting the ciphertext utilizing the third key to generate the encrypted credential store that is received by the distributed verification system; and
wherein the information that is stored in a distributed manner over the plurality of servers of the distributed verification system comprises the third key.

17. The method of claim 16 wherein utilizing the first key to control access to the encrypted credential store comprises:
utilizing the first key to authenticate a user associated with the user device; and
responsive to successful authentication of the user, providing the encrypted credential store to the user device;
wherein the user device decrypts the encrypted credential store based at least in part on the second key to recover the credential store.

18. An apparatus comprising:
a distributed verification system configured for communication with a user device over a network;
wherein the distributed verification system comprises one or more processing devices each having a hardware processor coupled to a memory and is further configured:
to receive from the user device a first key generated from a master key for a credential store;
to receive from the user device an encrypted version of the credential store, the encrypted credential store being encrypted by the user device based at least in part on a second key generated from the master key and information that is stored in a distributed manner over a plurality of servers of the distributed verification system, the distributed verification system comprising a controller configured to authenticate a user attempting to access the credential store; and
to utilize the first key to control access to the encrypted credential store;
wherein encryption of the credential store comprises generating a ciphertext by encrypting the credential store utilizing the second key, obtaining a third key, and encrypting the ciphertext utilizing the third key to generate the encrypted credential store that is received by the distributed verification system; and
wherein the information that is stored in a distributed manner over the plurality of servers of the distributed verification system comprises the third key.

19. The apparatus of claim 18 wherein the servers of the distributed verification system are implemented on respective distinct ones of a plurality of processing devices.

* * * * *